United States Patent

Pinchback

[11] 4,195,678
[45] * Apr. 1, 1980

[54] NUT

[75] Inventor: Tyrus R. Pinchback, West Bloomfield, Mich.

[73] Assignee: Wilson-Garner Company, Troy, Mich.

[*] Notice: The portion of the term of this patent subsequent to Nov. 2, 1993, has been disclaimed.

[21] Appl. No.: 840,111

[22] Filed: Oct. 6, 1977

Related U.S. Application Data

[60] Continuation of Ser. No. 667,051, Mar. 15, 1976, abandoned, which is a division of Ser. No. 490,463, Jul. 22, 1974, Pat. No. 3,989,082, which is a continuation of Ser. No. 230,441, Feb. 29, 1972, abandoned, which is a continuation of Ser. No. 10,940, Feb. 12, 1970, abandoned.

[51] Int. Cl.² ............................................. F16B 39/28
[52] U.S. Cl. ......................................................... 151/34
[58] Field of Search .................... 151/14 R, 29, 21 C, 151/28, 33, 34, 37, 43, 44, 53, 60; 85/32 R, 32 T

[56] References Cited

U.S. PATENT DOCUMENTS

| | | | |
|---|---|---|---|
| 333,362 | 12/1885 | Urseruck | 151/43 |
| 1,420,725 | 6/1922 | Mattson | 151/34 |
| 1,588,478 | 6/1926 | Lerch | 151/37 X |
| 1,734,445 | 11/1929 | Place | 151/21 C |
| 2,210,455 | 8/1940 | Hosking | 151/37 |
| 2,249,921 | 7/1941 | Van Sant | 151/37 |
| 2,931,410 | 4/1960 | Stoll | 151/21 C |
| 3,087,525 | 4/1963 | Nyswaner et al. | 151/37 X |
| 3,342,236 | 9/1967 | Clark | 151/38 |
| 3,823,526 | 7/1974 | Rose | 151/37 X |
| 3,989,082 | 11/1976 | Pinchback | 151/34 |

*Primary Examiner*—Thomas J. Holko
*Attorney, Agent, or Firm*—Harness, Dickey & Pierce

[57] ABSTRACT

A free spinning nut is formed with an asymmetric, double size recess in its bearing face and flutes in its side faces so as to enhance its holding capacity, particularly when used against softer material.

3 Claims, 7 Drawing Figures

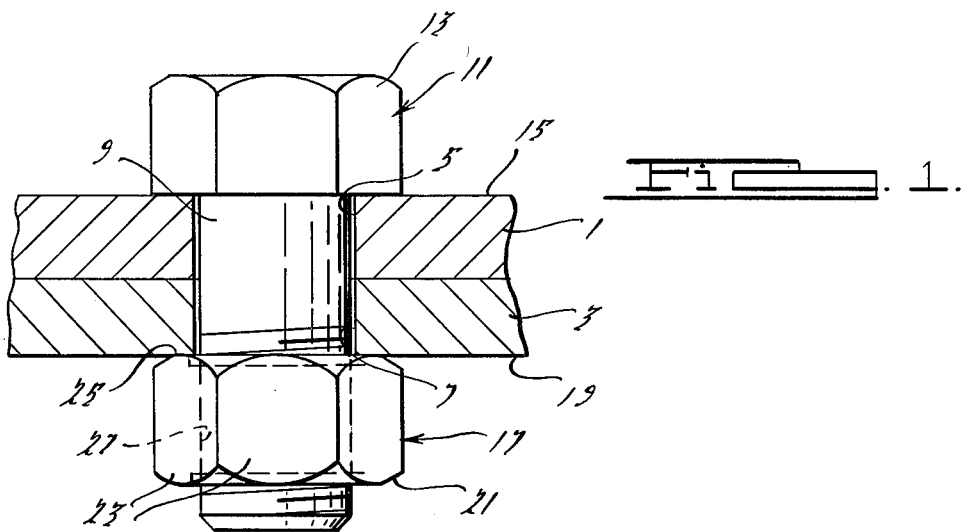
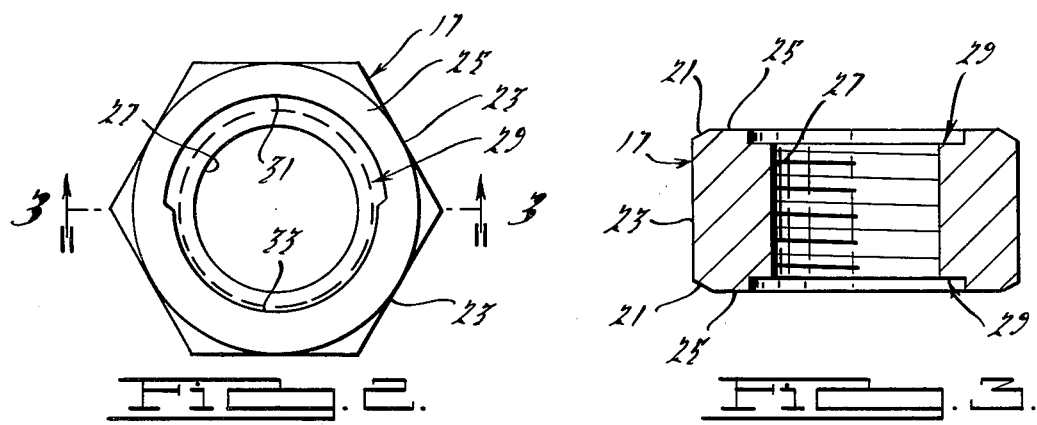
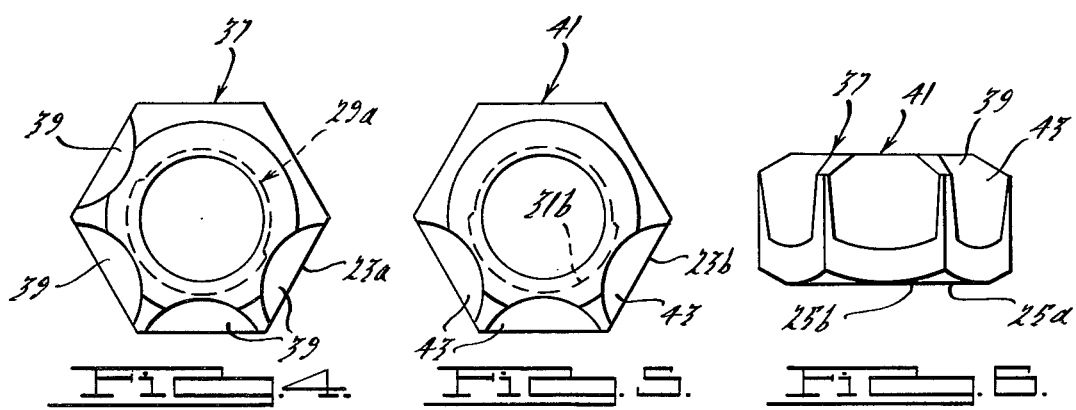
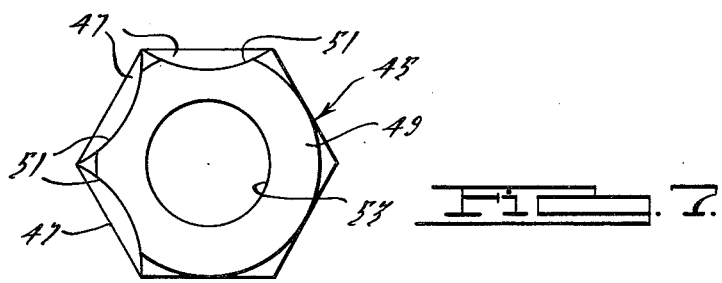

NUT

RELATED APPLICATIONS

This application is a continuation of application Ser. No. 667,051, filed Mar. 15, 1976, and now abandoned, which in turn is a divisional of may copending U.S. application Ser. No. 490,463, filed July 22, 1974 now U.S. Pat. No. 3,989,082 which, in turn, was a continuation of my now abandoned U.S. application Ser. No. 230,441, filed Feb. 29, 1972 which, in turn, was a continuation of my now abandoned U.S. application Ser. No. 10,940, filed Feb. 12, 1970.

BACKGROUND OF THE INVENTION

U.S. Pat. No. 3,342,236 shows various means for increasing the holding power of a free spinning bolt or cap screw, one of which comprises a double size groove on the bearing face of the bolt head. I have discovered that a double size groove may also be used to increase the holding power of a free spinning nut in applications where the nut is made of harder or denser material than the surface against which it is forced and that the holding power and other advantages may be additionally improved by fluting or weakening the side of the bolt, preferably in alignment with the larger part of the groove.

BRIEF SUMMARY OF THE INVENTION

It is the purpose of my invention to substantially increase the holding power of a free spinning nut. This is accomplished by providing an asymmetric groove means in the bearing face of the nut into which will be forced a slight amount of material of the surface against which the nut is tightened to act as a key inhibiting loosening of the nut. Weakening of the sidewall of the nut by asymmetric flutes or the like to provide a mass differential provides a further asymmetric condition that serves to prevent unloosening. The flutes also provide a means to overcome or minimize the end thread loading effect by spreading the load over several threads, thereby giving a stemming effect.

DESCRIPTION OF THE DRAWINGS

FIG. 1 is a side elevation, partly in section, of a tightened nut and bolt assembly;

FIG. 2 is an enlarged plan view of the nut of FIG. 1;

FIG. 3 is a cross section of the nut of FIG. 1 taken along the line 3—3 of FIG. 2;

FIG. 4 is a plan view of a modified form of nut;

FIG. 5 is a plan view of another modified form of nut;

FIG. 6 is a side elevation of either one of the nuts of FIGS. 4 and 5 showing the flutes; and FIG. 7 is a bottom view of another modified form of nut.

DESCRIPTION OF THE INVENTION

Referring to FIG. 1, the two parts 1 and 3 have aligned holes 5 and 7 which receive the shank 9 of a bolt 11. The head 13 of the bolt bears against the outer surface 15 of the part 1 and nut 17, which is threaded on the bolt 11, bears against the surface 19 of the part 3. In actual practice, stress, vibration, and embedding with lapse of time tend to cause the nut and bolt to unscrew from each other with consequent loss of force holding the parts 1 and 3 together and loosening of the joint. It is the purpose of the invention to provide means associated with the nut 17 to resist this tendency of the nut to be involuntarily moved angularly relative to the bolt.

The nut 17 shown in FIGS. 1–3 is symmetrical about a midplane perpendicular to its axis so that both ends are the same and either can be used to bear against the surface 19. The nut shown is hexagonal (though it can be any other desired contour) and chamfers 21 blend the ends of the nut into the flat sides 23 leaving bearing surfaces 25 that are circular and concentric on the outer diameter with the axis of the threaded center aperture 27 of the nut. The inner diameter of each bearing surface 25 is non-circular and asymmetric by virtue of a groove or recess 29 surrounding the threaded aperture 27 which has a wide half section 31 and a narrow half section 33. The wide section 31 is also preferably deeper than the section 33. The wide section 31 is preferably twice as wide and twice as deep as the narrow section 33. Since the outer part of the bearing surface 25 is circular the stress lines in surface 19 upon tightening of the nut and bolt will flow inwardly into hole 27 instead of outwardly where they might cause a potential fracture condition.

FIGS. 4 and 6 show a partially modified nut 37 wherein only the bottom of the nut has the bearing surface and the asymmetric recess 29a. The four flat sides 23a of the nut which are on the large half 31a of the recess are provided with reliefs in the form of concave indentations or flutes 39 which extend for forming purposes into the top end of the nut and reduce the sidewall thickness of the nut on that half side of the nut. As shown in FIG. 6, the flutes preferably extend more than half but less than the full length of the nut and are shaped as shown in the drawing. The nut 41 of FIGS. 5 and 6 is similar to nut 37 but the large half section 31b terminates in diametral alignment with the corners of flats and the three sides 23b subtended by the section 31b are provided with the flutes 43. The three flutes 39 preferably reduce the mass on their half of the nut 37 by about one-quarter while the four flutes 43 preferably reduce the mass on their half of the nut 41 by about one-third.

FIG. 7 shows a modified hex nut 45 which has three flutes 47 that extend into the bearing surface 49 on the bottom face of the nut to form curved notches 51 in the outer periphery of the bearing surface. In this form the double width may be omitted (as shown) and the inner periphery of the bearing formed as a circle surrounding bolt receiving aperture 53.

By controlling the length and depth of the flutes the number of threads over which the load is spread when the nut is tightened can be adjusted to eliminate the single end thread loading condition. Thus, the load could be spread over two or more threads to give a stemming effect and distribute the locking action over several threads. Variation of the size of the flutes also is a means to vary the asymmetric load condition and off center mass action of the nut to help make the nut highly resistant to loosening when subject to vibration. The length and depth of the flutes can vary in accordance with the design applications or be standardized, as desired. The flutes weaken the portion of the threaded wall adjacent them so that it deforms more than the solid, unfluted thread wall and this lets the weakened thread wall portion move in to hold more threads. The amount of such deformation for a given load and nut depends upon the size of the flutes.

The surface 19 of part 3 (and at least a slight depth below it) is softer and/or less dense than the nuts 17, 37, 41, or 45. When the bolt and nut are tightened, and/or when set occurs in use, the surface material will flow to some extent into the recess 29, 29a, 29b, or 51 where it is trapped. Since the recess 29 varies in width and/or depth the flow-in material will act as a key to resist release or angular movement of the nut relative to the bolt, i.e., the wider part of the bearing surface cannot track or rotate into the angular position of the narrow part of the bearing surface. The large section 31 or 49 cannot track into position occupied by the narrow section 33 or 51 because of brinelling action of the nut bearing surface 25 or 49 into the softer surface 19. Embedding of the nut and consequent loss of preload on the bolt 11 will not loosen the joint but instead will increase the lock because there will be more flow into the locking recesses. The differential mass in two halves of the sidewalls due to flutes 39, 43, or 47 in nuts 37, 41, or 45 and the asymmetric recess or bearing surface condition will create a slight tendency of the nut to cant or bind on the threads or to store bending energy thereby adding to the locking action of the nut.

It is especially significant that the locking action of the present nut does not depend upon inserts, thread destruction, or thread deformation. Instead the thread walls are solid and the nut is free spinning off and on and can be reused. In many instances the flow into recesses 29 or 51 will be elastic so that there is no substantial surface marring. The use of the counterbore-type recess 29 has the added advantage of eliminating the end thread load condition since the end thread is inside the aperture 27. The shape of the nut is such that it can be readily mass produced from conventional metals such as steel, aluminum, etc., as by manufacture on a five die nut former. It can also be formed of nonmetallic materials such as "Nylon".

Some modifications of the specific structures illustrated may be made within the broad purview of the invention. For example, instead of internal threads the apertures 27 could in some applications be smooth and the end of the bolt shank (or stud) peened or swaged over the top of the nut to force it against surface 19. Other specific recess shapes for recess means 29 may be used in conjunction with bearing surface 25 to serve as traps for metal flowing from the softer surface 19 to key the nut in angular position. Other specific side weakening shapes than flutes 39, 43, or 47 may be used. However, the structures illustrated are presently preferred.

I claim:

1. A concentric nut that is reusable and substantially free spinning off and on and having an axis comprising a body having an outer periphery with flats thereon and an inner threaded aperture and an annular flat bearing surface on at least one end face, said outer periphery, aperture, and bearing surface being substantially coaxial and the outer periphery being substantially symmetrical in shape with respect to said axis, said outer periphery having separate individual recess means of substantial width and depth in each of a plurality of the flats on substantially only one axial side of the body to provide said one axial side with a substantially lesser mass than the other axial side so that the mass of the nut is asymmetric with respect to said axis to provide for eccentric gripping of several bolt threads when the nut is threaded home on a bolt, said recess means terminating radially outwardly of said aperture and being less than the length of the nut and extending into one end face of the nut, the recess means extending into the bearing surface.

2. A concentric nut that is reusable and substantially free spinning off and on and having an axis comprising a body having an outer periphery with flats thereon and an inner threaded aperture and an annular flat bearing surface on at least one end face, said outer periphery, aperture, and bearing surface being substantially coaxial and the outer periphery being substantially symmetrical in shape with respect to said axis, said outer periphery having separate individual recess means of substantial width and depth in each of a plurality of the flats on substantially only one axial side of the body to provide said one axial side with a substantially lesser mass than the other axial side so that the mass of the nut is asymmetric with respect to said axis to provide for eccentric gripping of several bolt threads when the nut is threaded home on a bolt, said recess means terminating radially outwardly of said aperture and being less than the length of the nut and extending into said bearing face of the nut, said nut periphery being hexagonal and said recess means being formed in three faces thereof.

3. A nut that is reusable and substantially free spinning off and on comprising a body having a top and an outer periphery with flat sides and an inner threaded aperture and a flat annular bearing surface, said periphery, aperture, and surface being concentric and coaxial, and said periphery having a shape that is substantially symmetrical with respect to the common axis with the surface and aperture, said common axis being the axis of rotation of the nut, said bearing surface being normal to said axis, at least one of said flat sides having a concave scalloped indentation therein terminating radially outwardly of said aperture and extending over more than half but less than all of the length of the nut and opening into said bearing surface and extending over more than half the width of the flat and serving to reduce the thickness of the body between the aperture and the bottom of the indentation as compared with the thickness between the other flats and the aperture and to provide a different mass in one half of the body than the other and to spread load on the nut over more threads than a similar nut not having said indentation and to provide for eccentric gripping of several bolt threads when the nut is threaded home on a bolt.

* * * * *